Figure 1:
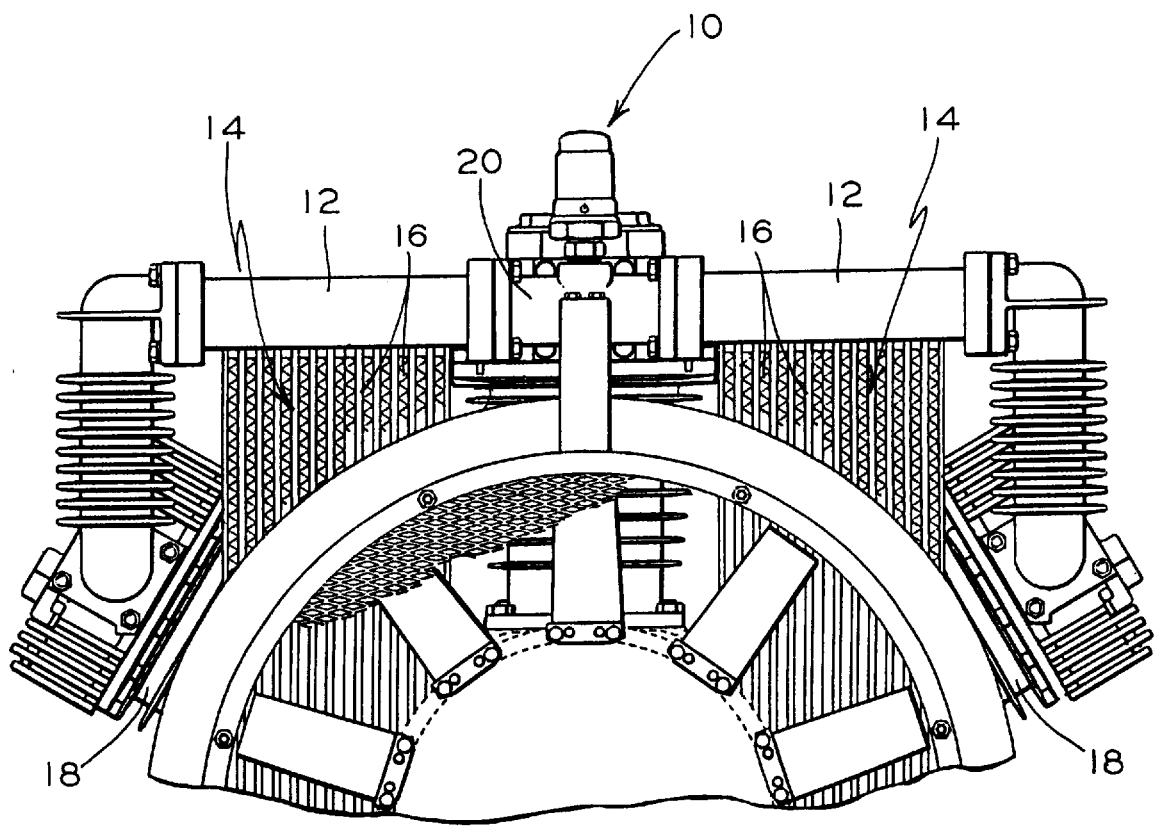

United States Patent [19]
Santoro, Jr. et al.

[11] Patent Number: 6,123,515
[45] Date of Patent: Sep. 26, 2000

[54] PRESSURE RELIEF VALVE WITH PNEUMATIC PILOT

[75] Inventors: Ralph Santoro, Jr., New Kensington; Brian L. Cunkelman, Blairsville, both of Pa.

[73] Assignee: Westinghouse Air Brake Company, Wilmerding, Pa.

[21] Appl. No.: 09/113,864

[22] Filed: Jul. 10, 1998

[51] Int. Cl.[7] .................................................. F04B 49/00
[52] U.S. Cl. ................................................ 417/243; 417/307
[58] Field of Search ................................ 417/243, 307; 137/494; 251/63.6

[56] References Cited

U.S. PATENT DOCUMENTS

| | | | |
|---|---|---|---|
| 4,145,025 | 3/1979 | Bergeron | 137/625.66 |
| 5,285,813 | 2/1994 | Quante et al. | 137/494 |
| 5,715,864 | 2/1998 | Andel et al. | 137/563 |

*Primary Examiner*—Henry C. Yuen
*Assistant Examiner*—Mahmoud Gimie
*Attorney, Agent, or Firm*—James Ray & Associates

[57] ABSTRACT

A pressure relief valve for rapidly exhausting air pressure from a source of such pressure. The valve includes a housing containing a valve member located across a main port provided in the housing that directly receives the air pressure from the pressure source. A second port is provided for receiving a pilot pressure from the pressure source, and a piston is located adjacent the second port. At least one exhaust port is provided in the housing for exhausting to atmosphere the air received through the main port and against the valve member.

8 Claims, 3 Drawing Sheets

PRESSURE RELIEF VALVE WITH PNEUMATIC PILOT

FIELD OF THE INVENTION

The present invention relates generally to a valve structure for rapidly exhausting air and, more particularly, this invention relates to a valve for the rapid release of air pressure in an intercooler connected to receive compressed air from an air compressor.

BACKGROUND OF THE INVENTION

U.S. Pat. No. 5,106,270 to Goettel et al discloses an air compressor comprised of two low pressure cylinders each of which discharges low pressure air into respective intercoolers to cool such compressed air before it enters a common manifold connection and inlet flange of a high pressure cylinder of the compressor. A single intercooler core design is also available that collectively receives the air discharged from low pressure cylinder heads and, again, cools the air before entering the high pressure head for second stage compression.

The compressor can be driven by an electric motor, as disclosed in the Goettel et al patent, though in times past, compressors in locomotives were driven directly by the diesel engine of the locomotive. In this manner, while the diesel engine was idling, the compressor continued to run, though at the slow idle speed.

Recent compressor designs are operated by electric motors in a stop/start fashion, the compressors being started when pressurized air is needed and stopped when pressurized air is not needed. Such electric motors operate from a voltage generated by an alternator in the locomotive, which alternator is driven by the diesel engine of the locomotive. When diesel engine RPM is low, such as in an idle condition, the alternator produces only a limited amount of electrical power. Such a limited amount of power may be insufficient to operate the compressor motor at a speed sufficient for the compressor to deliver the required amount of compressed air. When this occurs, the air compressor must operate at a speed greater than that at which the motor is capable of operating when supplied by the electrical characteristics of the alternator.

For this reason, compressor motors may have a dual pole, dual speed configuration, i.e., a first group of magnetic poles equal in number to that of the supply voltage alternator are provided such that for low speed operation, the compressor turns at essentially the same speed as the alternator (and the mechanical drive of the diesel engine) less any losses, since the poles of the motor and alternator are equal. However, the compressor should also be able to run faster than engine speed, such as an idle speed, to assure a sufficient compressed air output and to overcome train line losses. If a second group of motor poles is provided that is half that of the alternator, the compressor runs at twice diesel engine/alternator speed. In this manner, the locomotive crew can operate the locomotive at a lower engine speed (to save fuel and reduce engine wear) while, at the same time, produce a sufficient amount of compressed air for brakes and other pneumatically operated devices.

When additional air pressure is called for, the compressor motor is signaled to operate at the higher speed. When this occurs, the compressor is unloaded (exhausted) of air pressure so that the motor can start (transition) under unloaded conditions. When a compressor is unloaded, it rotates freely and thus places a very light load on the motor driving the compressor. If the motor is required to start or transition against a pressure load in the compressor, the rotor of the compressor can appear to the motor to be locked, and can thereby burn out the motor, as the motor draws large amounts of current to overcome the force of compression in the compressor. The compressor rotor includes a crankshaft that operates pistons in the cylinders of the compressor, the pistons being the agent by which the compressed air is formed. It is therefore understandable that with air pressure in the cylinders acting against the pistons and thus against the crankshaft of the compressor, the drive motor of the compressor has a difficult task in rotating the crankshaft.

The time duration for a dual pole configuration motor to transition from its relatively slow speed operation to the doubling high speed operation is on the order of one second. Hence, when the motor changes speed there may still be air pressure in the high pressure head of the compressor, as supplied by the intercooler(s). It is therefore necessary that intercooler air pressure be discharged rapidly so that the compressor motor does not have to start, i.e., change speeds, against a pressure load in the high pressure cylinder of the compressor.

OBJECTS OF THE INVENTION

It is therefore a primary object of the present invention to exhaust an intercooler in the time it takes to transition a dual pole compressor motor, which is on the order one second.

Another object of the present invention is to provide a simple, low cost relief valve that provides such rapid intercooler exhausting while retaining the normal pressure relief function of the valve.

SUMMARY OF THE INVENTION

Intercoolers are normally provided with a relief valve that is designed to open and relieve intercooler pressure when intercooler pressure become excessive. The present invention retains this function while incorporating in the valve a piloting function using a pneumatic signal directed to the valve. The signal is directed beneath an auxiliary piston in the valve to instantly open the valve and thereby exhaust intercooler pressure. The piston can be located in a separate cap adapted to be secured to one end of a housing of existing relief valves. The other end of such relief valves contains a valve member disposed to receive pressure directly from an intercooler. Excessive pressure in the intercooler moves the valve member to open the valve. This movement is against a spring that keeps the valve closed when pressure in the intercooler is not excessive.

When a compressor is to be unloaded for stating purposes, a pneumatic signal is employed to order such unloading under the auspices of a governor. In the present invention, this signal is also used to open the relief valve by moving the auxiliary piston in a manner that relieves pressure on the spring. This allows the valve member in the relief valve to move immediately past the exhaust ports provided in the valve housing to vent to atmosphere the air received for the intercooler.

The valve device of the invention is a simple, low cost means of packaging a relief or blowdown valve for use in the above discussed compressor/intercooler of U.S. Pat. No. 5,106,270 to Goettel et al. or with single intercooler designs. The valve of the invention can be a completely new and original structure, using all new components, or it can use existing intercooler relief valves by adding an end cap containing the auxiliary piston and a small port for receiving the pneumatic (pilot) signal.

In either case the valve of the present invention operates instantly, i.e., on the order of about one second so that the compressor is unloaded in a manner that allows its drive motor to start in an unloaded condition.

When the needs of a locomotive and a train of cars require restoration to an operational level of compressed air, the governor signals the compressor to provide such a restoration of pressure. This requires that the relief valve of the invention be closed so that the compressor can build the needed pressure. The pilot signal that ordered unloading of the compressor is removed by the governor, which also removes the pilot signal from the relief valve of the present invention. The spring in the valve now closes the valve member so that the exhaust ports are closed and the compressor thereby builds the needed pressure.

THE DRAWINGS

Figure 2:
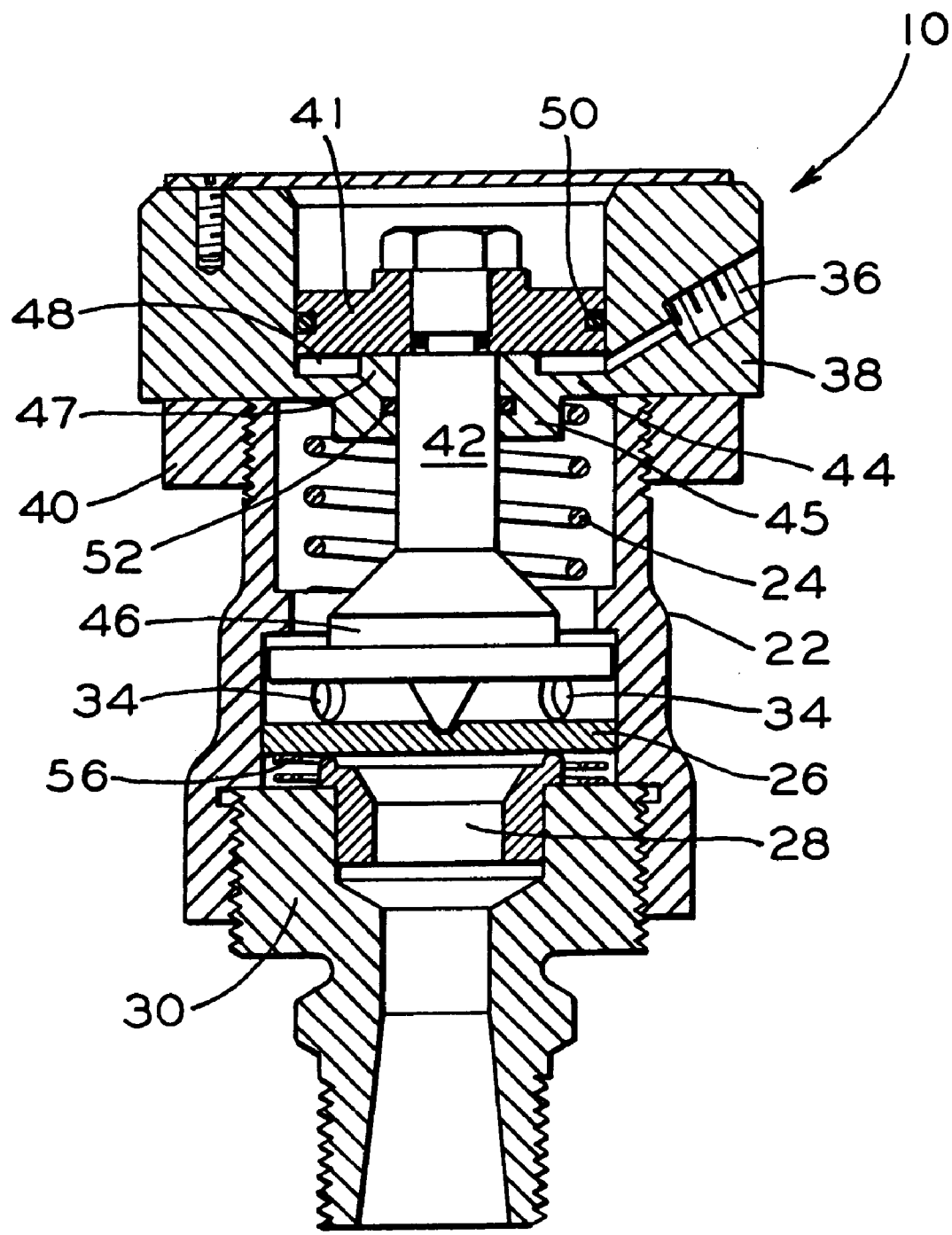
Figure 3:
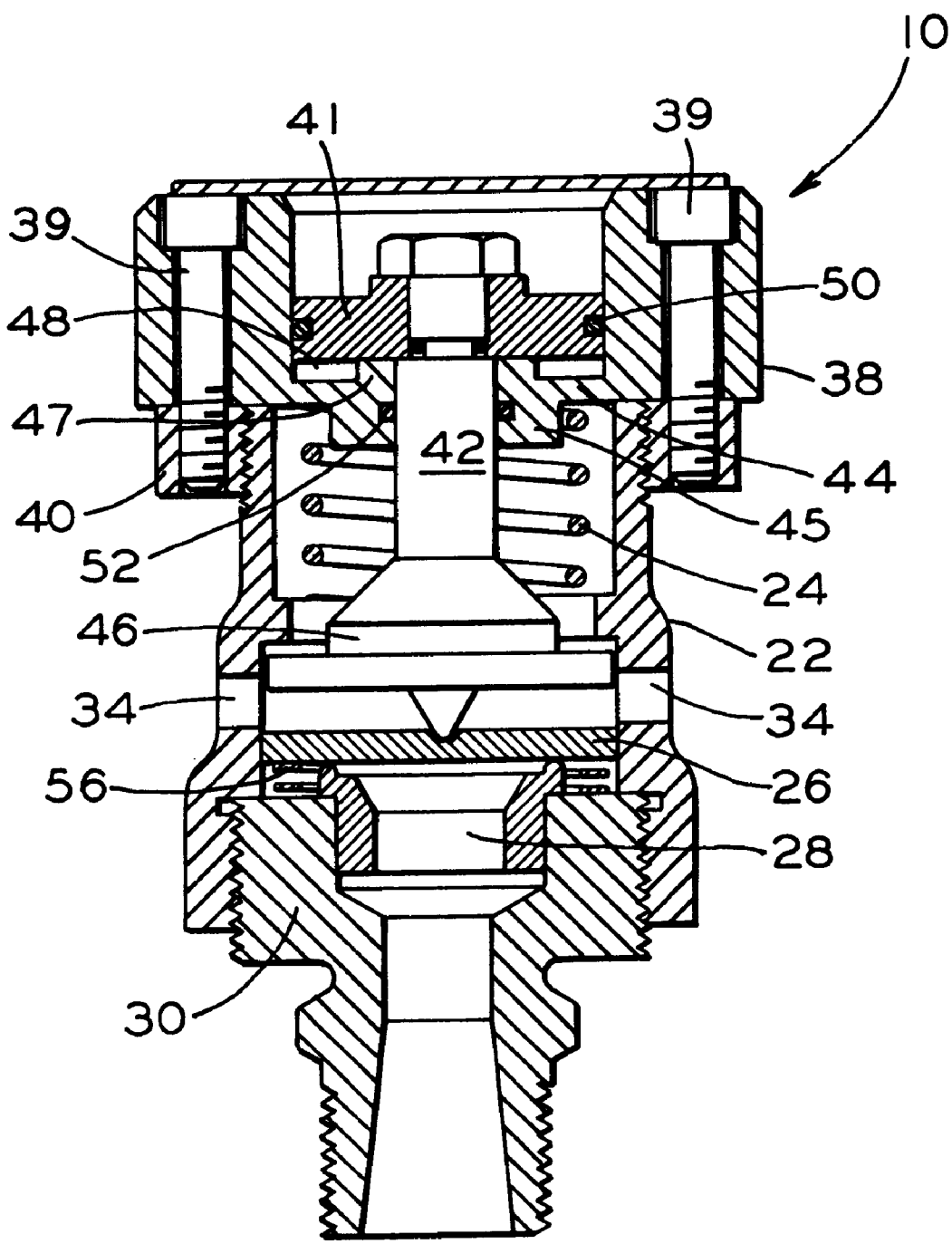

The invention, along with its advantages and objectives, will be better understood from the following detailed description and the accompanying drawings in which:

FIG. 1 is a partial elevation view of two intercoolers of the apparatus disclosed in the above Goettel, et al. patent, with the relief valve of the invention shown pneumatically connected to a manifold connecting the two intercoolers together, FIG. 2 is a sectional view of the piloted relief valve of the present invention having a pilot port and an auxiliary piston; and FIG. 3 is a sectional view of the valve of FIG. 2 showing exhaust ports located above an exhaust valve member in the relief valve.

PREFERRED EMBODIMENT

Prior to proceeding to the much more detailed description of the present invention, it should be noted that identical components which have identical functions have been identified with identical reference numerals throughout the several views illustrated in the drawing figures for the sake of clarity and understanding of the invention.

Referring now to FIG. 1 of the drawing, a relief valve 10 of the invention is shown pneumatically connected to two manifolds 12 of two respective intercoolers 14 of a compressor/intercooler combination (depicted as partial view), i.e. the manifolds connect valve 10 to cooling tubes 16 of the intercoolers and to respective, low pressure cylinders 18 of a compressor, not otherwise visible in FIG. 1. A pipe fitting 20 connects the inner ends of the manifolds together and to the valve, the valve being threaded into an upwardly facing opening (not visible) provided in fitting 20.

Pipe fitting 20 also pneumatically connects valve 10 and intercoolers 14 to a high pressure cylinder of the compressor (not visible in FIG. 1).

The partial view of FIG. 1 is that of the compressor/intercooler/aftercooler combination disclosed in the above referenced Goettel et al. patent, though the relief valve of the invention will function in other air pressure environments and with other apparatus providing a source of pressurized air needing relief from excessive pressure.

FIG. 2 of the drawings shows in cross section a preferred embodiment of the invention. More particularly, FIG. 2 shows a housing 22 of relief valve 10 containing a spring 24 and a main valve member 26. Spring 24 biases the valve member in a closed position over and against a main port 28 located in a lower end wall 30 of the housing. End wall 30 includes an integral, threaded nipple 32 for threading into a member containing a gas under pressure, such as pipe fitting 20 in FIG. 1.

As thus for described, the valve of FIG. 2, and of FIG. 3, is a standard relief valve employed to open when the pressure received at port 28 becomes excessive. Such pressure is exhausted to atmosphere through ports 34 (FIG. 3) when valve member 26 is moved upwardly against spring 24 and past the ports 34 in FIG. 3.

In the present invention, the relief valve of FIGS. 2 and 3 is modified to open and exhaust air pressure when it receives a pneumatic signal at a port 36 provided in a cap 38 secured to the end of valve housing 22 opposite the end of main port 28. Cap 38 can be secured to valve housing 22 by a plurality of bolts 39 (visible in FIG. 3) threaded into a ring 40 located on the upper end of the valve housing. The ring itself can be secured to the valve housing by appropriate threads provided in the ring and on the housing end.

If the original relief valve had an upper end wall or cap closing the valve, such an end wall or cap is removed and replaced by the cap 38. Cap 38 is sized to contain a piston 41 located to receive a pilot pressure beneath the piston. Without the presence of such a pilot pressure, the expansion force of spring 24 maintains valve member 26 against main port 28 under pressure conditions in port 28 that do not require relief. Piston 41 is mechanically connected to a shaft 42 that extends between the piston and valve member. The upper end of the shaft in FIGS. 2 and 3 extends through an upper transverse wall 44 separating the spring from the piston. Wall 44 also separates the interior of housing 22 from the interior of cap 38. Transverse wall 44 is provided with an integral boss 45 that receives and centers the upper end to spring 24 while the lower end of the spring is centered on a wide end 46 of shaft 42.

With no pilot pressure signal supplied to port 36, and with normal pressure in main port 28, piston 41 seats against wall 44 while shaft 42 and spring 24 maintains valve member 26 against lower wall 30 which closes port 28.

When a signal pressure is received at pilot port 36, such pressure moves piston away from wall 44 and translates shaft 42 upwardly and away from valve member 26. Spring 24 is thereby compressed against wall 44 and valve member 26 moves upwardly under the force of intercooler pressure in port 28 to a location that places exhaust ports 34 (FIG. 3) in communication with main port 28. When this occurs, the pressure in main port 28 and in intercooler 14 is quickly exhausted to atmosphere through ports 34. This occurs when the same pneumatic signal is received by the compressor to unload its air pressure for transitioning between the dual pole configuration of the drive motor. In this manner, the motor starts against an unloaded compressor and an exhausted intercooler. And, in this manner, motor life is substantially extended.

The size of exhaust ports 34 are such that intercooler air is exhausted in the time frame of motor transition, which is on the order of one second.

Wall 44 is also provided with a ridge or extension 47 facing in the direction of piston 41 to provide an annular space 48 beneath the piston. This space provides a small annular plenum that receives the pilot pressure from port 36, and functions to rapidly translate piston 41 and valve member 26 against the force of spring 24 for exhaustion of intercooler air.

When the pilot pressure signal is removed from port 36 and plenum 48, the piston returns to its seat on ridge 47 under the expanding force of spring 24 against valve member 26. This closes main port 28. This action allows the compressor to compress air for its intended use, which air is cooled by the intercooler 14 before it is sent to the high pressure cylinder of the compressor.

As seen FIGS. 2 an 3, an O-ring 50 is located on the periphery of piston 41 to prevent leakage of air past the piston. Spring 24 keeps piston 41 against wall 44 without the presence of the pilot signal, and the spring keeps valve member 26 closed without the pilot signal and with normal pressure in port 28.

In addition, a second O-ring 52 is located on the upper end of shaft 42 and between the shaft and boss 45 of wall 44 to prevent leakage of pilot air into the chamber of spring 24.

A light wave spring 56 can be placed between valve member 26 and end wall 30 of the valve to prevent valve member 26 from flapping or fluttering when shaft 42 is moved upwardly by the pilot signal directed to piston 41.

While the presently preferred embodiment for carrying out the instant invention has been set forth in detail according to the Patent Act, those persons skilled in the compressor system art to which this invention pertains will recognize various alternative ways of practicing the invention without departing from the spirit and scope of the claims appended hereto.

What is claimed is:

1. A unitary pressure relief and blowdown valve for rapidly exhausting air pressure from a source of such pressure, said valve comprising a housing containing a valve member located across a main port in said housing connected for directly receiving air pressure from such source, a second port connected for receiving a pilot pressure provided under control of a governor, a piston located adjacent said second port for receiving said pilot pressure in a manner that moves the valve member away from said main port to open the same, and at least one exhaust port provided in said housing and in direct fluid communication with the main port for exhausting to atmosphere air received through said main port and against said valve member when said valve member is moved away from the main port by the piston receiving the pilot pressure.

2. The pressure relief valve of claim 1 wherein the piston and second port are provided in an end cap secured to the end of the valve housing opposite the main port, which cap and piston provide a retrofit for an existing pressure relief valve.

3. The pressure relief valve of claim 2 wherein the end cap is secured to the valve housing by a plurality of bolts threaded into a ring secured to the end of the valve housing opposite the main port of said housing.

4. The relief valve of claim 3 wherein the ring is threadably secured to said housing end.

5. The pressure relief valve of claim 1 wherein the second port is located beneath the piston for moving the piston in a manner that allows the valve member to move past the exhaust port when the second port receives the pilot pressure.

6. The pressure relief valve of claim 1 wherein a transverse wall separates the piston from a spring, said wall having a recess located beneath the piston for receiving the pilot pressure from the second port.

7. The pressure relief valve of claim 1 wherein a second spring is located between the valve member and an end wall portion of the valve housing located about the main port of the housing.

8. The pressure relief valve of claim 1 wherein the source of pressurized air is an intercooler pneumatically connected to an air compressor.

* * * * *